(12) United States Patent
Holman

(10) Patent No.: US 8,127,213 B2
(45) Date of Patent: Feb. 28, 2012

(54) METHOD, SYSTEM, AND APPARATUS FOR ADJACENT-SYMBOL ERROR CORRECTION AND DETECTION CODE

(75) Inventor: Thomas Holman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 11/968,148

(22) Filed: Dec. 31, 2007

(65) Prior Publication Data

US 2008/0104476 A1    May 1, 2008

Related U.S. Application Data

(62) Division of application No. 11/584,059, filed on Oct. 20, 2006, now Pat. No. 7,496,826, which is a division of application No. 10/624,424, filed on Jul. 21, 2003, now abandoned.

(51) Int. Cl.
*H03M 13/00* (2006.01)
(52) U.S. Cl. ........................................ 714/785; 714/784
(58) Field of Classification Search .................. 714/752, 714/784, 785
See application file for complete search history.

(56) References Cited

U.S. PATENT DOCUMENTS

| | | | |
|---|---|---|---|
| 3,728,678 A | 4/1973 | Tong | |
| 4,740,968 A | 4/1988 | Aichelmann, Jr. | |
| 5,490,155 A | 2/1996 | Abdoo et al. | |
| 5,701,314 A * | 12/1997 | Armstrong et al. | 714/765 |
| 5,748,652 A | 5/1998 | Kim | |
| 5,768,294 A | 6/1998 | Chen et al. | |
| 5,987,629 A * | 11/1999 | Sastry et al. | 714/48 |
| 6,272,659 B1 * | 8/2001 | Zook | 714/774 |
| 6,405,339 B1 * | 6/2002 | Cox et al. | 714/756 |
| 6,662,336 B1 * | 12/2003 | Zook | 714/786 |
| 6,751,769 B2 | 6/2004 | Chen et al. | |
| 6,820,229 B1 * | 11/2004 | Sollish | 714/767 |
| 6,981,196 B2 | 12/2005 | Davis et al. | |
| 7,181,673 B2 * | 2/2007 | Sollish | 714/767 |
| 7,234,099 B2 | 6/2007 | Gower et al. | |
| 2007/0061685 A1 | 3/2007 | Holman | |

FOREIGN PATENT DOCUMENTS

| | | |
|---|---|---|
| EP | 0889407 A2 | 1/1999 |
| KR | 0147150 | 9/1998 |

OTHER PUBLICATIONS

"International Application No. PCT/US2004/022353, PCT Search Report dated Jan. 27, 2005".
"U.S. Appl. No. 10/624,424 Office Action mailed Sep. 6, 2006".
"Korean Application No. 10-2006-7001341, Office Action, 6 pgs."

* cited by examiner

*Primary Examiner* — Esaw Abraham
(74) *Attorney, Agent, or Firm* — Caven & Aghevli LLC

(57) ABSTRACT

A circuit and method for generating an Error Correcting Code (ECC) based on an adjacent symbol codeword that is formed in two clock phases. In an embodiment, a set of m bits of a first symbol and a set of m bits of a second symbol from a first set of data for transmission over a channel during a first clock phase are generated. A set of n bits of the first symbol and a set of n bits of the second symbol from a second set of data over a channel are also generated during a second clock phase. Other embodiments are also claimed and/or disclosed.

6 Claims, 4 Drawing Sheets

METHOD, SYSTEM, AND APPARATUS FOR ADJACENT-SYMBOL ERROR CORRECTION AND DETECTION CODE

CROSS-REFERENCE TO RELATED APPLICATIONS

This application is a divisional of U.S. patent application Ser. No. 11/584,059 filed Oct. 20, 2006, entitled, "A METHOD, SYSTEM, AND APPARATUS FOR ADJACENT-SYMBOL ERROR CORRECTION AND DETECTION CODE", now U.S. Pat. No. 7,496,826, which is a divisional of U.S. patent application Ser. No. 10/624,424, filed Jul. 21, 2003 entitled "A METHOD, SYSTEM, AND APPARATUS FOR ADJACENT-SYMBOL ERROR CORRECTION AND DETECTION", abandoned, and is related to U.S. patent application Ser. No. 11/585,411, filed Oct. 23, 2006, entitled "A METHOD, SYSTEM, AND APPARATUS FOR ADJACENT-SYMBOL ERROR CORRECTION AND DETECTION", abandoned.

BACKGROUND

1. Field

The present disclosure pertains to the field of memory and computer memory systems and more specifically to error detection and correction for memory errors.

2. Description of Related Art

Error correcting codes (ECC) have been routinely used for fault tolerance in computer memory subsystems. The most commonly used codes are the single error correcting (SEC) and double error detecting (DED) codes capable of correcting all single errors and detecting all double errors in a code word.

As the trend of chip manufacturing is toward a larger chip capacity, more and more memory subsystems will be configured in b-bits-per-chip. The most appropriate symbol ECC to use on the memory are the single symbol error correcting (SbEC) and double symbol error detecting (DbED) codes, wherein "b" is the width (number of bits in output) of the memory device, that correct all single symbol errors and detect all double symbol errors in a code word. A memory designed with a SbEC-DbED code can continue to function when a memory chip fails, regardless of its failure mode. When there are two failing chips that line up in the same ECC word sometime later, the SbEC-DbED code would provide the necessary error detection and protect the data integrity for the memory.

Existing and imminent memory systems utilize eighteen memory devices. However, the present SbEC-DbED error correcting codes utilize 36 memory devices in order to provide chipfail correction and detection. Thus, the cost increases due to the added expense of 36 memory devices for error correcting purposes and they are inflexible because they do not scale (adapt) to the memory systems with eighteen memory devices. Furthermore, the various circuits for encoding and decoding the errors are complex. Thus, this increases the cost and design of computer systems to insure data integrity.

BRIEF DESCRIPTION OF THE FIGURES

The present invention is illustrated by way of example and not limitation in the Figures of the accompanying drawings.

DETAILED DESCRIPTION

The following description provides a method, apparatus, and system for error detection and correction of memory devices. In the following description, numerous specific details are set forth in order to provide a more thorough understanding of the present invention. It will be appreciated, however, by one skilled in the art that the invention may be practiced without such specific details. Those of ordinary skill in the art, with the included descriptions will be able to implement appropriate logic circuits without undue experimentation.

As previously described, typical ECC code utilizes 36 memory devices for chipfail detection and correction that results in increased cost and design of a computer system. Also, with the advent of eighteen memory devices in a system, the present ECC codes do not scale. In contrast, the claimed subject matter facilitates a newt ECC code, "adjacent-symbol" code that supports memory systems with 18 memory devices For example, in one embodiment, the claimed subject matter facilitates the ability for decoding and correcting memory errors in systems that utilize 18 memory devices for a memory transaction (memory rank). Furthermore, the claimed subject matter facilitates forming a code word of data with only two clock phases. Also, the adjacent-symbol ECC code corrects any error pattern within the data from one memory device and detects various errors (double device errors) from failures in 2 memory devices.

In one embodiment, the adjacent-symbol ECC code is utilized for a memory system with two channels of Double Data Rate (DDR) memory, wherein each channel is 64 bits wide with eight optional bits for FCC. Also, the memory system may utilize ×4 or ×8 wide memory devices (×4 and ×8 refers to the number of bits that can be output from the memory device). Thus, the claimed subject matter supports various configurations of memory systems. For example, a memory system with ×8 devices would utilize 18 memory devices per memory rank if ECC is supported otherwise, 16 memory devices per memory rank if FCC is not supported. Alternatively, a memory system with ×4 devices would utilize 36 memory devices per memory rank if ECC is supported, otherwise, 32 memory devices per memory rank if ECC is not supported.

Figure 1:
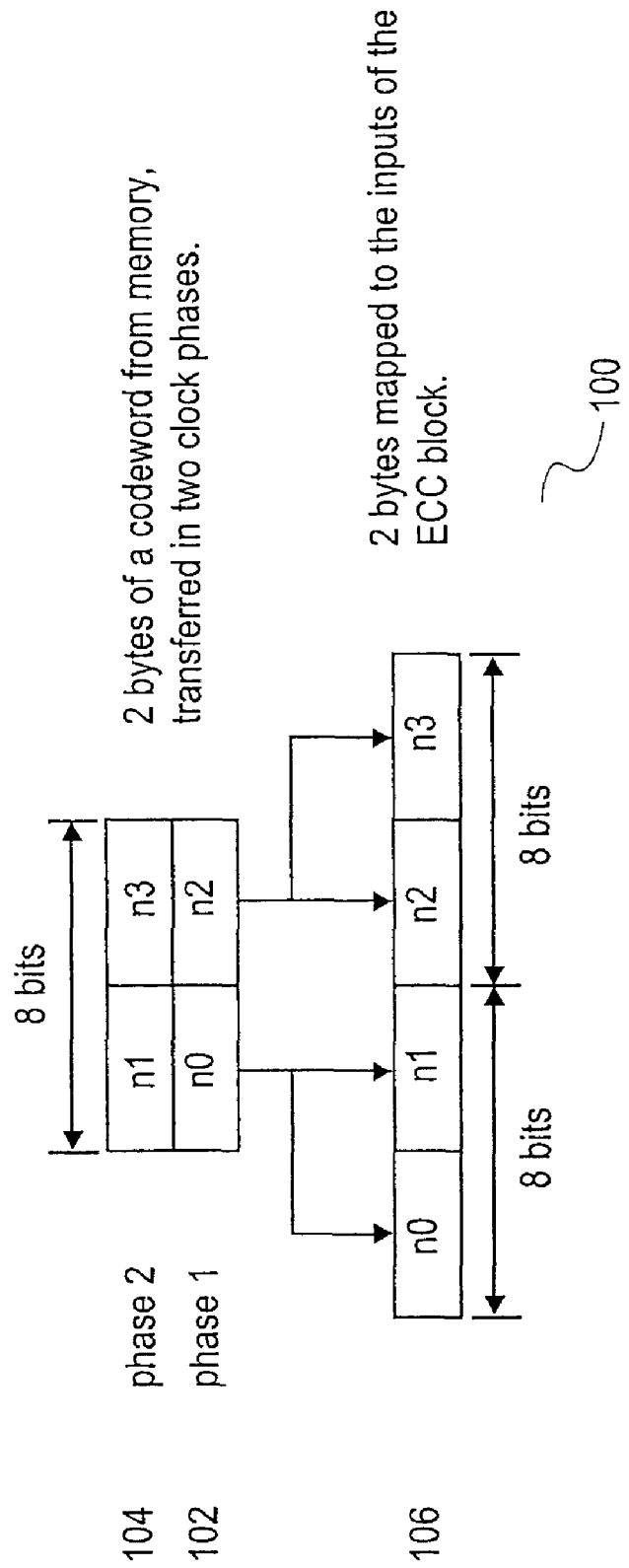
FIG. 1 illustrates a block diagram of a code word utilized in an embodiment.

FIG. 1 illustrates a block diagram of a code word utilized in an embodiment. The block diagram 100 comprises an adjacent symbol codeword 106 to be formed from two clock phases of data 102 and 104 from a memory device. For example, in one embodiment, a memory access transaction comprises a transfer of 128 data bits plus an additional 16 ECC check bits per clock edge, for a total of 144 bits for each clock edge (288 bits for both clock edges). In a first clock phase 102, a first nibble "n0" and a second nibble "n2" of data from a memory are transferred and mapped to a first nibble of each of two symbols of the codeword 106. Subsequently, during a second clock phase 104, a first nibble "n1" and a second nibble "n3" from a memory are transferred and mapped to a second nibble of each of two symbols of the codeword 106. Thus, the two symbols of the codeword 106 are adjacent and are on a 16 bit boundary of the code word, which are designated as "adjacent symbols", thus, the codeword 106 is an adjacent symbol codeword.

The scheme illustrated in the block diagram facilitates error detection and improves fault coverage of common mode errors. For example, for an ×4 memory device, there is a one to one mapping of nibbles from the ×4 memory device to a symbol in the underlying code word. In contrast, for a ×8 memory device, there is a one to one mapping of nibbles from half of the ×8 memory device to a symbol in the underlying code word. Thus, the claimed subject matter facilitates isolating common mode errors across nibbles to the symbol level and results in increased fault coverage. Therefore, for the ×8 memory device, the claimed subject matter precludes aliasing for a second device failure. Likewise, device errors in the ×4 memory devices are isolated to a single symbol in the codeword 106, thus, there is complete double device coverage for the ×4 memory devices.

To further illustrate, there are typically two classes of double device failures, simultaneous and sequence that occur in the same memory rank.

A simultaneous double device failure has no early sign warning because there is no indication of an error in a previous memory transaction. Typically, the computer system reports an uncorrectable error in the absence of an aliasing. However, the system might incorrectly report a correctable single device failure. This time the aliasing may be discovered in subsequent accesses because an error pattern might change as to preclude the alias.

In contrast, a sequential double device failure is a more typical failure pattern than a, simultaneous double device failure. Typically, the first device error is detected as a correctable error. For a second device failure, there may be two outcomes in one embodiment; the error is reported as uncorrectable otherwise, the error is reported as a correctable error at a new location. In the event of an uncorrectable error for the second device failure, the analysis is complete. Otherwise, the system changes the error location from the first device failure to the second device's failure location. Therefore, the preceding method for detecting the alias is accurate because it is unlikely that the first device failure location resolves itself and even less likely that is does: at the simultaneous instant that the second device failure has failed.

A few examples of double device errors that are always detected (no aliasing) are double bit errors, double wire faults, wire faults in one memory device with a single bit error in a second memory device, and a fault that affects only one nibble of each memory device.

In one example of a device error for the ×8 memory device, all 16 bits of the codeword (adjacent symbols) may be affected (corrupted) because the failure results in an error for both nibbles and both clock phases of the memory device's data. Thus, the claimed subject matter facilitates the correction of this device failure by first correcting the 16 bits that are in error. However, in the event of a second memory device failure, the code detects the error pattern in two groups of 16 bits which are aligned on 16-bit boundaries in the code word 106.

Figure 2:
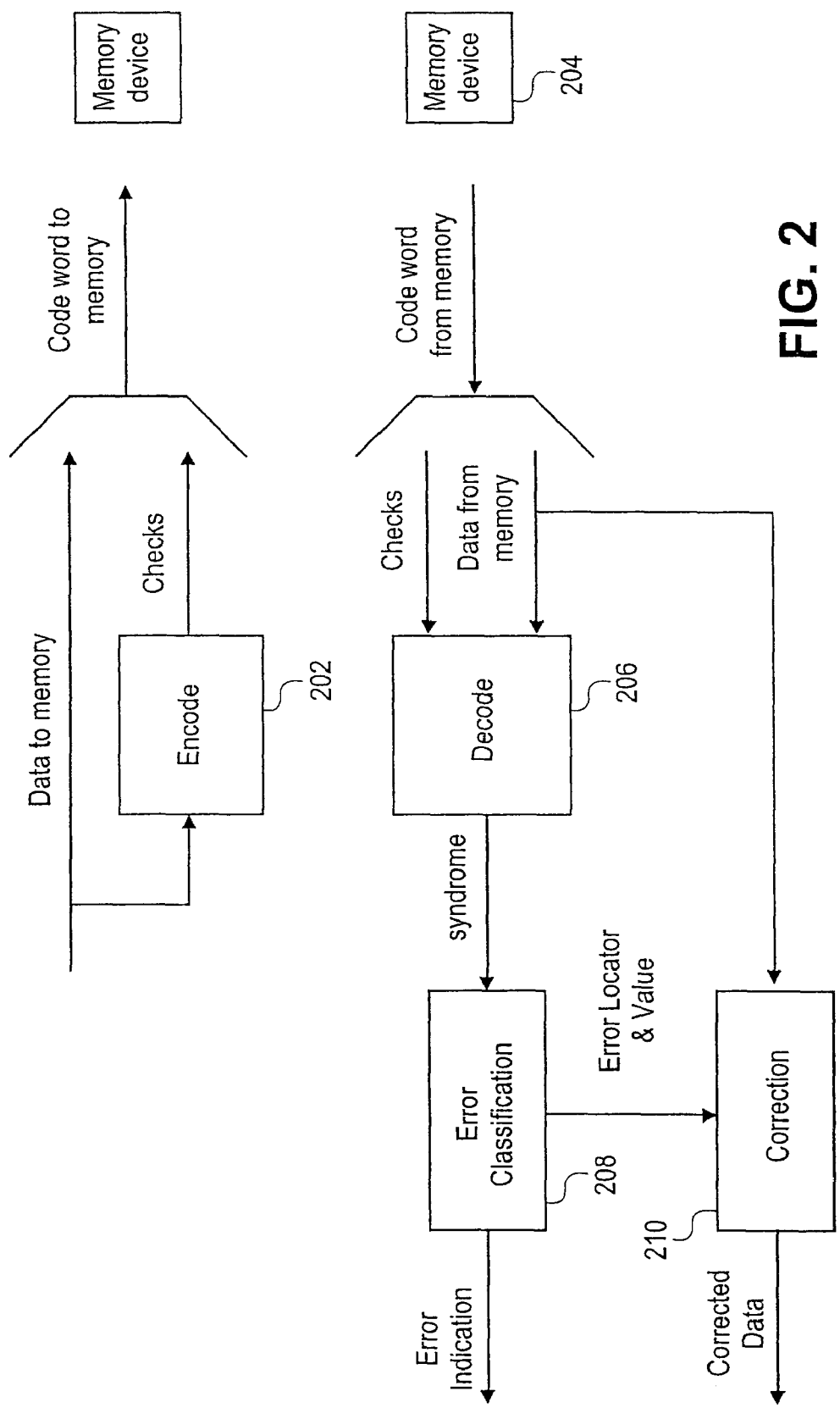
FIG. 2 illustrates an apparatus utilized in an embodiment.

FIG. 2 illustrates an apparatus utilized in an embodiment. From a high-level perspective, the apparatus generates a code word by creating check bits to be appended to data that is forwarded to memory. Subsequently, the apparatus generates a syndrome based at least in part on decoding the code word received from memory and facilitates classifying errors and correcting the errors. In one embodiment, the code word from the memory device is an adjacent symbol codeword that was described in connection with FIG. 1.

The apparatus comprises an encoder circuit 202, at least one memory device 204, a decoder circuit 206, an error classification circuit 208, and a correction circuit 210.

The encoder circuit receives data that is to be forwarded to the memory device or memory devices 204. The encoder circuit generates a plurality of check bits based at least in part on the data. Thus, a codeword is formed based at least in part on the plurality of check bits and the data and is forwarded to the memory device or memory devices 204.

In one embodiments the check bits are generated from the binary form of a G-matrix, wherein the matrix has 32 rows and 256 columns to form 32 check bits. The check bits are computed as follows:

$$c_i = \Sigma d_j \times G_{ij} \text{ for } i=0 \text{ to } 31 \text{ and } j=0 \text{ to } 255$$

For binary data, the multiply operation becomes an AND function and the sum operation the 1-bit sum or XOR operation. Thus, the resulting encoding circuit comprises 32 XOR, each tree computing one of the 32 check bits.

Subsequently, the memory device or memory devices 104 returns data and the check bits back to the decoder circuit 106. In one embodiment, the decoder circuit generates a 32-bit syndrome based at least in part on a 288-bit code word (as earlier described ill connection with FIG. 1 for the 288-bit code word).

In one embodiment the syndrome is generated from an H-matrix, wherein the matrix comprises 32 rows and 288 columns. Each syndrome bit is calculated as follows:

$$s_i = \Sigma v_j \times H_{ij} \text{ for } i=0 \text{ to } 31 \text{ and } j=0 \text{ to } 287$$

As previously described with the encoder circuit, the generation of the syndrome bits is simplified to a XOR operation over the code word bits corresponding to the columns of the H-matrix that have a binary 1 value. Thus, the decoding circuit comprises 32 XOR trees, each tree computing one of the 32 syndrome bits. Therefore, in one embodiment, a 32 bit syndrome is generated by an H matrix receiving a 288 bit codeword. However, the claimed subject matter is not limited to this bit configuration. One skilled in the art appreciates modifications to the size of the syndrome and codeword.

The error classification and error correction are described in connection with FIG. 4.

Figure 3:
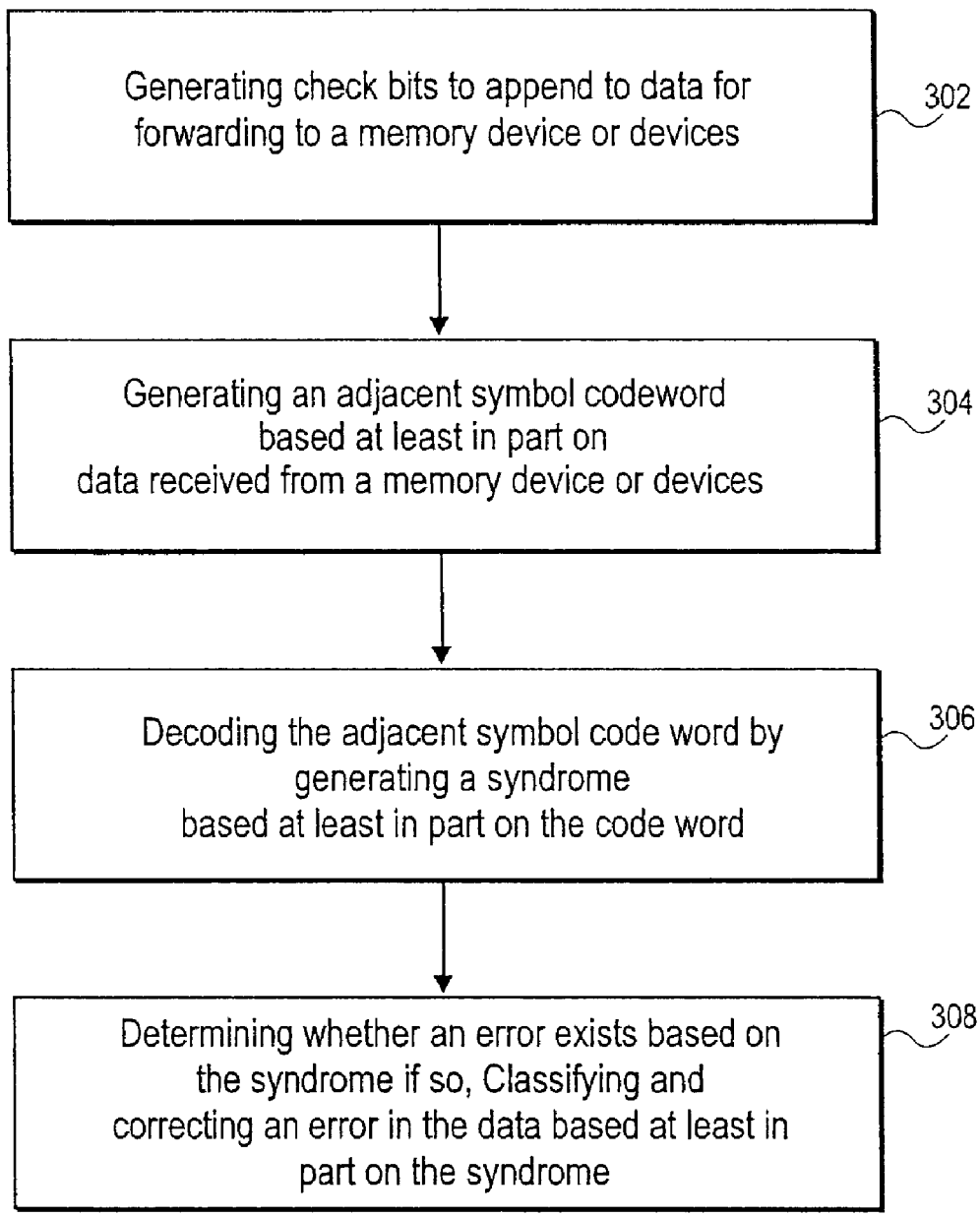
FIG. 3 illustrates a flowchart of a method utilized in all embodiment.

FIG. 3 depicts a flowchart for a method utilized in all embodiment. The flowchart depicts a method for detecting whether there were errors in data in a transaction with a memory device or devices. A first block 302 generates check bits to be appended to data for forwarding to a memory device or devices. An adjacent symbol codeword is generated based at least in part on data received from the memory device or devices to be utilized for checking the integrity of the data, as depicted by a block 304. A decoder generates a syndrome based at least in part on the adjacent symbol codeword, as depicted by a block 306. In the presence of an error as determined by the syndrome, an error classification and correction is performed, as depicted by a block 308.

Figure 4:
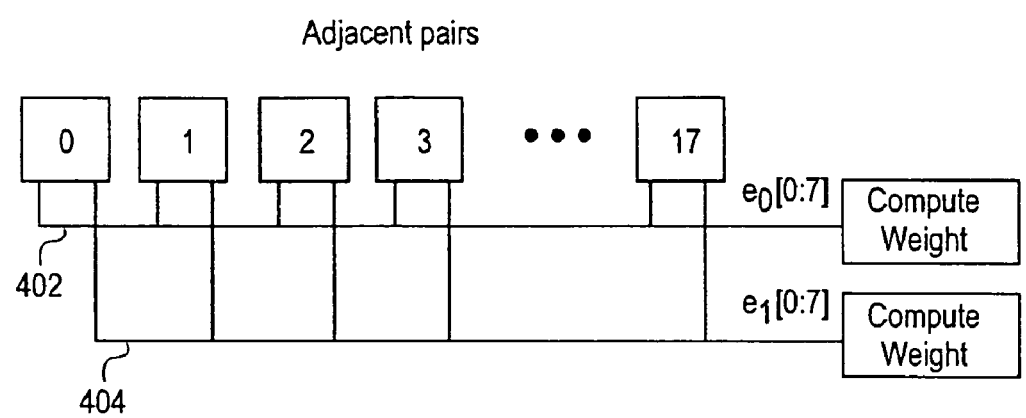
FIG. 4 illustrates an apparatus utilized in an embodiment described in connection with FIG. 2.

FIG. 4 illustrates an apparatus utilized in al embodiment described in connection with FIG. 2. As previously described, FIG. 4 describes one embodiment of the error classification and error correction in connection with FIG. 2.

The error classification is based at least in part on the decoding circuit's computation of the syndrome. For example, in one embodiment, if the syndrome (S)==0, then there is NO error. Otherwise, if the syndrome (S)>0, there is an error. Also, it is optional to further classify the error by computing an error location vector L. For example, in one embodiments the error is uncorrectable if L==0. Otherwise, the error is correctable in an indicated column if L>0. Furthermore, one may further classify the correctable error as whether the error occurs in a data column or check column.

For example if the error is in a check column, the data portion of the code word may bypass the correction logic.

In yet another embodiment, a single device correctable error may be classified based at least in part on a weight of the error value. As depicted in FIG. 4, an adjacent pair may generate error values eo and el. Thus, the error locator vector L is then used to gate the error values on a plurality of busses, 402 and 404 because the circuits allow for the error locator bits for one adjacent pair will be enabled for a given error pattern.

Thus, the claimed subject matter allows for test coverage of both single and double device errors.

Figure 5:
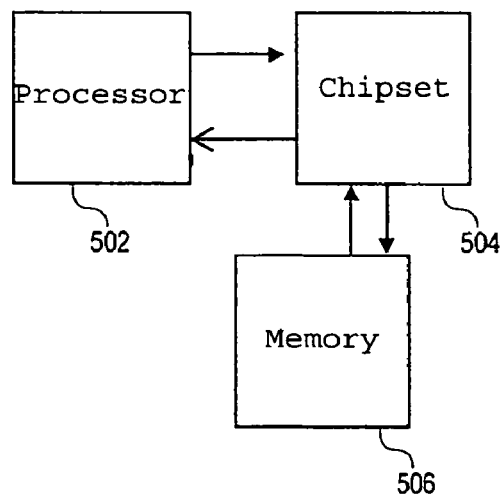
FIG. 5 illustrates a system utilized in an embodiment.

FIG. 5 depicts a system in accordance with one embodiment. The system in one embodiment is a processor 502 that is coupled to a chipset 504 that is coupled to a memory 506. For example, the chipset performs and facilitates various operations, such as, memory transactions between the processor and memory and verifies the data integrity by utilizing the adjacent symbol codeword as described in connection with FIG. 1. In one embodiment, the chipset is a server chipset to support a computer server system. In contrast, in another embodiment, the chipset is a desktop chipset to support a computer desktop system. In both previous embodiments, the system comprises the previous embodiments depicted in FIGS. 1-4 of the specification to support the adjacent symbol codeword and error correction and detection methods and apparatus.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
   generating a set of m bits, wherein m is an integer, of a first symbol and a set of m bits of a second symbol from a first set of data for transmission over a channel to a memory during a first clock phase;
   generating a set of n bits, wherein n is an integer, of the first symbol and a set of n bits of the second symbol from a second set of data over a channel to the memory during a second clock phase;
   receiving a codeword from the memory in response to the first set and second set of data;
   generating a syndrome based on the codeword;
   detecting whether an error exists based on the syndrome; and
   classifying the error if it exists,
   wherein existence of an error is to be determined based on a syndrome and wherein a single device error is to be classified in response to a determination of a weight of a plurality of error values.

2. The method of claim 1 wherein the first and second set of data are stored in the memory.

3. The method of claim 2 wherein the memory is a Double Data Rate (DDR) memory.

4. The method of claim 1 wherein both m and n are four bits and constitute a nibble.

5. The method of claim 1 wherein the codeword is an adjacent symbol codeword which comprises an adjacent formation of the first and second symbol.

6. The method of claim 1 further comprising isolating a common mode error across the m and n bits of the first and second symbol.

* * * * *

UNITED STATES PATENT AND TRADEMARK OFFICE
CERTIFICATE OF CORRECTION

PATENT NO. : 8,127,213 B2  
APPLICATION NO. : 11/968148  
DATED : February 28, 2012  
INVENTOR(S) : Thomas J. Holman Page 1 of 1

It is certified that error appears in the above-identified patent and that said Letters Patent is hereby corrected as shown below:

On the first page, in field (75), in column 1, in "Inventor", line 1, delete "Thomas Holman," and insert -- Thomas J. Holman, --, therefor.

On the first page, in field (56), in column 2, in "Other Publications", line 4, delete "Action," and insert -- Action Received, Jan. 29, 2008, --, therefor.

Signed and Sealed this
Twenty-second Day of May, 2012

David J. Kappos
*Director of the United States Patent and Trademark Office*